(12) United States Patent
Garn et al.

(10) Patent No.: US 8,686,083 B2
(45) Date of Patent: Apr. 1, 2014

(54) COMPOSITE MEDIA FOR FLUID STREAM PROCESSING, A METHOD OF FORMING THE COMPOSITE MEDIA, AND A RELATED METHOD OF PROCESSING A FLUID STREAM

(75) Inventors: Troy G. Garn, Idaho Falls, ID (US);
Jack D. Law, Pocatello, ID (US);
Mitchell R. Greenhalgh, Iona, ID (US);
Troy J. Tranter, Mena, AZ (US);
Rhonda Tranter, legal representative, Mena, AZ (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 201 days.

(21) Appl. No.: 13/291,214

(22) Filed: Nov. 8, 2011

(65) Prior Publication Data

US 2013/0116112 A1    May 9, 2013

(51) Int. Cl.
*C08K 3/34*        (2006.01)
*B01J 29/04*       (2006.01)

(52) U.S. Cl.
USPC ............................................ 524/450; 502/62

(58) Field of Classification Search
USPC ....................................................... 524/450
See application file for complete search history.

(56) References Cited

U.S. PATENT DOCUMENTS

| | | | |
|---|---|---|---|
| 3,063,217 A | 11/1962 | Armond et al. | |
| 3,308,069 A | 3/1967 | Wadlinger et al. | |
| 3,703,797 A | 11/1972 | Lepold et al. | |
| 4,054,427 A | 10/1977 | Schroeter et al. | |
| 4,088,737 A | 5/1978 | Thomas et al. | |
| 4,239,655 A | 12/1980 | Inoue et al. | |
| 4,337,171 A | 6/1982 | Kulprathipanja et al. | |
| 4,461,631 A | 7/1984 | Itabashi et al. | |
| 4,466,812 A | 8/1984 | Takaishi et al. | |
| 4,775,585 A * | 10/1988 | Hagiwara et al. | 428/323 |
| 4,822,492 A | 4/1989 | Chao et al. | |
| 4,913,850 A | 4/1990 | Puppe et al. | |
| 5,011,667 A | 4/1991 | Kuznicki et al. | |
| 5,039,500 A | 8/1991 | Shino et al. | |
| 5,833,737 A | 11/1998 | Tamura et al. | |
| 7,115,542 B2 | 10/2006 | Tranter et al. | |
| 2003/0015473 A1 | 1/2003 | Murphy et al. | |
| 2003/0173287 A1 | 9/2003 | Johnston et al. | |
| 2011/0168638 A1* | 7/2011 | Tranter et al. | 210/688 |
| 2013/0152787 A1* | 6/2013 | Boulet et al. | 95/91 |

FOREIGN PATENT DOCUMENTS

JP       543162    * 1/1979 ................ C08J 9/26

OTHER PUBLICATIONS

English abstract of JP54-3162, Jan. 11, 1979.*

* cited by examiner

*Primary Examiner* — Hui Chin
(74) *Attorney, Agent, or Firm* — TraskBritt (57) ABSTRACT

A composite media including at least one crystalline aluminosilicate material in polyacrylonitrile. A method of forming a composite media is also disclosed. The method comprises dissolving polyacrylonitrile in an organic solvent to form a matrix solution. At least one crystalline aluminosilicate material is combined with the matrix solution to form a composite media solution. The organic solvent present in the composite media solution is diluted. The composite media solution is solidified. In addition, a method of processing a fluid stream is disclosed. The method comprises providing a beads of a composite media comprising at least one crystalline aluminosilicate material dispersed in a polyacrylonitrile matrix. The beads of the composite media are contacted with a fluid stream comprising at least one constituent. The at least one constituent is substantially removed from the fluid stream.

26 Claims, 3 Drawing Sheets

COMPOSITE MEDIA FOR FLUID STREAM PROCESSING, A METHOD OF FORMING THE COMPOSITE MEDIA, AND A RELATED METHOD OF PROCESSING A FLUID STREAM

GOVERNMENT RIGHTS

This invention was made with government support under Contract Number DE-AC07-05ID14517 awarded by the United States Department of Energy. The government has certain rights in the invention.

TECHNICAL FIELD

Embodiments of the present disclosure relate to a composite media for fluid stream processing, to a method of forming the composite media, and to a related method of processing a fluid stream.

BACKGROUND

Effective and efficient fluid stream processing is one consideration in numerous chemical and industrial processes. An example of such a process involves the removal of materials such as krypton, xenon, and iodine from nuclear fuel treatment off-gas streams prior to discharge or disposal of the fluid stream. Krypton and iodine are generally present in such nuclear fuel treatment off-gas streams as the radioactive isotopes (e.g., krypton-85, iodine-131, iodine-129, etc.) that must be removed to avoid various detrimental environment impacts. Xenon is a rare gas useful in a broad array of commercial applications (e.g., medical applications).

Numerous processes have been developed to separate and enrich materials such as krypton, xenon, and iodine from a fluid stream. For example, an active component, such as a crystalline aluminosilicate material, may be provided to contact the fluid stream and remove at least one of the krypton, xenon, and iodine by way of adsorption. The effectiveness and efficiency of the active component is at least partially a function of the total surface area of the active component that contacts the fluid stream. Larger active component surface areas are capable of removing a greater amount of material from the fluid stream.

Providing the active component in, for example, a powder form or a finely granulated form provides a large surface area of the active component. However, such forms may also induce resistance to flow (e.g., pressure drops), compromising the rate at which the fluid stream is processed. Namely, as particle size is reduced (i.e., as it is when the active component is provided as a powder or plurality of small granules), the size of the air spaces or openings between adjacent particles is correspondingly reduced, decreasing the flow rate of a fluid stream through the particles. The concept is generally expressed by the equation Q=Va, where "Q" is the volume of fluid flow per unit of time, "V" is the velocity of the fluid, and "a" is the area (e.g., air space between adjacent particles) through which the fluid passes.

To resolve the aforementioned flow problems while maintaining a large surface area of the active component, a finely granulated form or a powdered form of the active component may be compressed under high pressure to form relatively larger active component pellets. However, the flow of fluid through the active component pellets tends to wash away some of the active component, reducing the effectiveness and efficiency of the active component pellets over time. In addition, such active component pellets tend to be brittle and crumble over time, which may render them inadequate for fluid stream processing. Thus, active component pellets are not well suited to withstand the conditions that may occur in many industrial environments.

As an alternative to the powdered, finely granulated, and pelletized forms of the active component, a composite media can be provided that includes the active component disposed within a supporting matrix. The composite media elements have a relatively larger, generally spherical shape, enabling large voids to exist between a number of adjacent composite media elements, and reducing the fluid stream flow restriction problems previously discussed. The supporting matrix may be an inorganic material, such as a clay (e.g., kaolin clay, bentonite clay, or attapulgite clay), a silica, or alumina, which is stable under radioactive conditions. The active component is loaded into the supporting matrix. Disadvantageously, however, the inorganic materials conventionally used as the supporting matrix have minimal, if any, porosity, limiting the effectiveness and efficiency of the composite media for processing fluid streams. Namely, the fluid stream is substantially unable to interact with the active component disposed within the bulk of the composite media (i.e., active component not exposed along an outer peripheral surface of the composite media), which results in a low active component surface area and a correspondingly limited ability of the composite media to remove material from the fluid stream.

In view of the foregoing, there remains a need for a composite media including a matrix that is stable in a radiation environment and that is sufficiently porous to facilitate better loading of the active component. Such a composite media would provide a relatively larger surface area of the active component, and would, for example, be beneficial in effectively and efficiently processing fluid streams including at least one of krypton (e.g., radioactive isotopes thereof), iodine (e.g., radioactive isotopes thereof), and xenon.

BRIEF SUMMARY

Embodiments described herein include a composite media for fluid stream processing, to a method of forming the composite media, and to a related method of processing a fluid stream. For example, in accordance with one embodiment described herein, a composite media comprises at least one crystalline aluminosilicate material in polyacrylonitrile.

In additional embodiments, a method of forming a composite media comprises dissolving polyacrylonitrile in an organic solvent to form a matrix solution. At least one crystalline aluminosilicate material is combined with the matrix solution to form a composite media solution. The organic solvent present in the composite media solution is diluted. The composite media solution is solidified.

In yet additional embodiments, a method of processing a fluid stream comprises providing beads of a composite media comprising at least one crystalline aluminosilicate material dispersed in a polyacrylonitrile matrix. The bead of the composite media are contacted with a fluid stream comprising at least one constituent. The at least one constituent is substantially removed from the fluid stream.

DETAILED DESCRIPTION

A composite media for processing a fluid stream is disclosed, as is a method of forming the composite media, and a related method of processing a fluid stream. The composite media includes at least one active component substantially homogeneously dispersed in an organic polymer matrix. The composite media has radiolytic stability, relatively high loading of the active component, and a large surface area of the active component as compared to conventional composite media, resulting in increased loading capacities for at least one constituent of the fluid stream. The fluid stream may be a gas stream that includes at least one radioactive constituent. In addition, the shape of the composite media and the porosity of the organic polymer matrix therein (i.e., which defines the surface area of the active component) enables fluid to readily flow through the composite media, facilitating effective and efficient processing of high flow rate fluid streams.

The illustrations presented herein are not meant to be actual views of any particular composite media or device including the composite media, but are merely idealized representations which are employed to describe embodiments of the present disclosure. Only those process acts and structures necessary to understand the embodiments of the present disclosure are described in detail below. Additionally, elements common between figures may retain the same numerical designation.

As used herein, the terms "comprising," "including," "containing," "characterized by," and grammatical equivalents thereof are inclusive or open-ended terms that do not exclude additional, unrecited elements or method acts, but also include the more restrictive terms "consisting of and" and "consisting essentially of" and grammatical equivalents thereof. As used herein, the term "may" with respect to a material, structure, feature or method act indicates that such is contemplated for use in implementation of an embodiment of the present disclosure and such term is used in preference to the more restrictive term "is" so as to avoid any implication that other, compatible materials, structures, features and methods usable in combination therewith should or must be, excluded.

Figure 1:
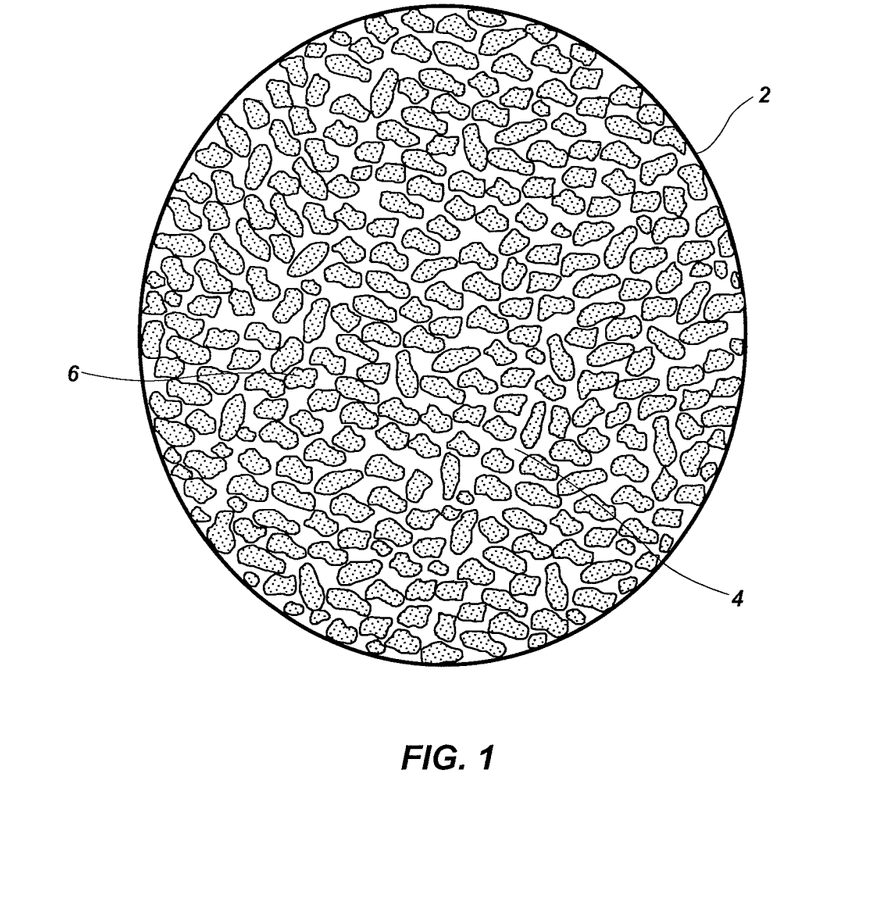
FIG. 1 is a schematic drawing illustrating a composite media, in accordance with an embodiment of the present disclosure.

An embodiment of the present disclosure will now be described with reference to FIG. 1, which illustrates a bead of composite media 2 including an organic polymer matrix 4 and at least one active component 6. The at least one active component 6 may be substantially homogeneously dispersed or distributed within the organic polymer matrix 4. The composite media 2 may include from about 5% by weight (wt %) to about 95 wt % of the at least one active component 6, such as from about 10 wt % to about 90 wt % of the at least one active component 6, or from about 70 wt % to about 90 wt % of the at least one active component 6. The remainder of the composite media 2 may be the organic polymer matrix 4. In at least some embodiments, the composite media 2 includes about 80 wt % of the at least one active component 6 and about 20 wt % of the organic polymer matrix 4. The composite media 2 may have an active component 6 surface area, defined by the porosity of the organic polymer matrix 4, within a range of from about 250 $m^2/g$ to about 450 $m^2/g$, as measured by conventional BET surface area measurement methods. In comparison, conventional composite media, such as composite media including an active component disposed within clay mineral or other inorganic materials, may have a considerably smaller active component surface area (e.g., within a range of from about 20 $m^2/g$ to about 60 $m^2/g$).

As used herein, the term "organic polymer matrix" means and includes an organic polymer material within which the active component 6 may be substantially homogeneously dispersed. The organic polymer matrix 4 may be a macroporous organic polymer having radiolytic stability and compatibility with the at least one active component 6. As used herein, the term "macroporous" means and includes a material including pores or cavities larger than about 50 nanometers (nm). As used herein, the term "radiolytic stability" means and includes an ability to substantially resist degradation in the presence of one or more radioactive isotopes (e.g., $^{85}Kr$, $^{131}I$, $^{129}I$, or combinations thereof). As used herein, the term "compatible" means and includes a material that does not react, break down, or absorb another material in an unintended way, and that also does not impair the chemical and/or mechanical properties of the another material in an unintended way. The organic polymer matrix 4 may have radiolytic stability similar to the stability of conventional inorganic binder materials (e.g., silicas, alumina, and clays, such as kaolin clay, bentonite clay, and attapulgite clay). For example, the organic polymer matrix 4 may have radiolytic stability in a nuclear fuel treatment off-gas stream. The macroporosity of the organic polymer matrix 4 may at least enable the composite media 2 to have improved weight loading of the active component 6 and a larger surface area of the active component 6, as compared to conventional composite media (e.g., silicas, alumina, and clays, such as kaolin clay, bentonite clay, and attapulgite clay). For example, the at least one active component 6 may be affixed or absorbed to surfaces within pores of the organic polymer matrix 4 (i.e., facilitating greater surface area of the active component 6, and hence greater exposure of the active component 6, as compared to conventional composite media). The organic polymer matrix 4 may be selected such that the porosity and surface area of the organic polymer material is maintained during formation of the composite media 2. Processing conditions used to form the composite media 2 may be such that the porosity and surface area of the composite media 2 is substantially the same as the porosity and surface area of the organic polymer matrix 4. In at least some embodiments, the organic polymer matrix 4 is polyacrylonitrile (PAN). As used herein, the term "PAN" means and includes an acrylonitrile homopolymer, or a copolymer containing at least about 40% acrylonitrile units. For example, the PAN may be an acrylonitrile polymer or a copolymer having a ratio of at least about 40% acrylonitrile molecules to total molecules. PAN may be provided in a solid form. The acrylonitrile homopolymer may be used in at least one of a crystalline, quasicrystalline, or amorphous phase. While PAN is described herein as an example of the organic polymer matrix 4, a person of ordinary skill in the art, using the guidance of the present disclosure, may utilize other materials for the organic polymer matrix 4.

As used herein, the term "active component" refers to those materials, however embodied, that use a variety of mechanisms to remove at least one constituent from a fluid stream. As used herein, the term "fluid stream" means and includes a substantially gaseous stream, a substantially liquid stream, or a stream including gaseous and liquid constituents. In at least some embodiments, the fluid stream is a substantially gaseous stream that contains at least one of noble gas fission products, halogen products, oxygen ($O_2$), and nitrogen ($N_2$), such as a nuclear fuel treatment off-gas stream. The at least one constituent to be removed from the fluid stream may be an undesirable constituent of the fluid stream, such as a radioactive isotope, or may be a desirable constituent of the fluid stream, such as a rare gas. By way of non-limiting example, the at least one constituent may be krypton (Kr) (e.g., at least one of a radioactive isotope and a non-radioactive isotope thereof), xenon (Xe), $N_2$, $O_2$, iodine (I) (e.g., at least one of a radioactive isotope and a non-radioactive isotope thereof), or combinations thereof. In one or more embodiments, the at least one constituent of the fluid stream includes radioactive isotopes of Kr (e.g., $^{85}Kr$), non-radioactive isotopes of Kr, and Xe. The at least one active component 6 may remove the at least one constituent of the fluid stream by way of physisorption (also known as "physical adsorption"), chemisorption (also known as "chemical adsorption"), ion exchange, absorption, extraction, complexation, or combinations thereof. By employing one or more of these mechanisms, the at least one active component 6 may remove, extract, separate, concentrate, or otherwise desirably process the at least one constituent of the fluid stream.

The at least one active component 6 may, for example, be a microporous sorbent or a similar material that may remove the at least one constituent from the fluid stream by way of at least one of physisorption and chemisorption. As used herein, the term "microporous" means and includes a material including pores or cavities smaller than about 2 nm. As used herein, the term "physisorption" means and includes a mechanism wherein the at least one constituent of the fluid stream is adsorbed or bound (i.e., directly or indirectly) in available pores of the at least one active component 6 and held in place by way of weak intermolecular forces, such as Van der Waals forces. As used herein, the term "chemisorption" means and includes a mechanism wherein the at least one constituent of the fluid stream is adsorbed or bound in available pores of the at least one active component 6 by way of a chemical bonding, such as covalent bonding or ionic bonding. The at least one active component 6 may, for example, be used in powder form. As non-limiting example, the at least one active component 6 may be a crystalline aluminosilicate material, such as at least one of a natural form and a synthetic form of a zeolite material (e.g., a mordenite material, such as hydrogen mordenite, or silver mordenite), having sufficient pore size to facilitate passage of the at least one constituent of the fluid stream therethrough. In at least one embodiment, the at least one active component 6 is hydrogen mordenite, which may, for example, be used to remove at least one of radioactive isotopes of Kr (e.g., $^{85}Kr$), non-radioactive isotopes of Kr, and Xe from the fluid stream by way of physisorption. Hydrogen mordenite in powdered form is commercially available from numerous sources including, but not limited to, Zeolyst International, Valley Forge, Pa. In additional embodiments, the at least one active component 6 is silver mordenite, which may, for example, be used to remove at least one of radioactive isotopes of Kr (e.g., $^{85}Kr$), non-radioactive isotopes of Kr, and Xe from the fluid stream by way of physisorption, and may also be used to remove at least one of radioactive isotopes of I (e.g., $^{131}I$, and $^{129}I$) and non-radioactive isotopes of I by way of chemisorption. Silver mordenite is commercially available from numerous sources including, but not limited to, C*Chem, (Lafayette, Colo.), or UOP L.L.C. (Des Plaines, Ill.). Silver mordenite may also be synthesized using techniques known in the art. Particles of the at least one active component 6 may have a size within a range of from about 0.5 micron to about 50 micron, may be of uniform or non-uniform shape.

Figure 2:
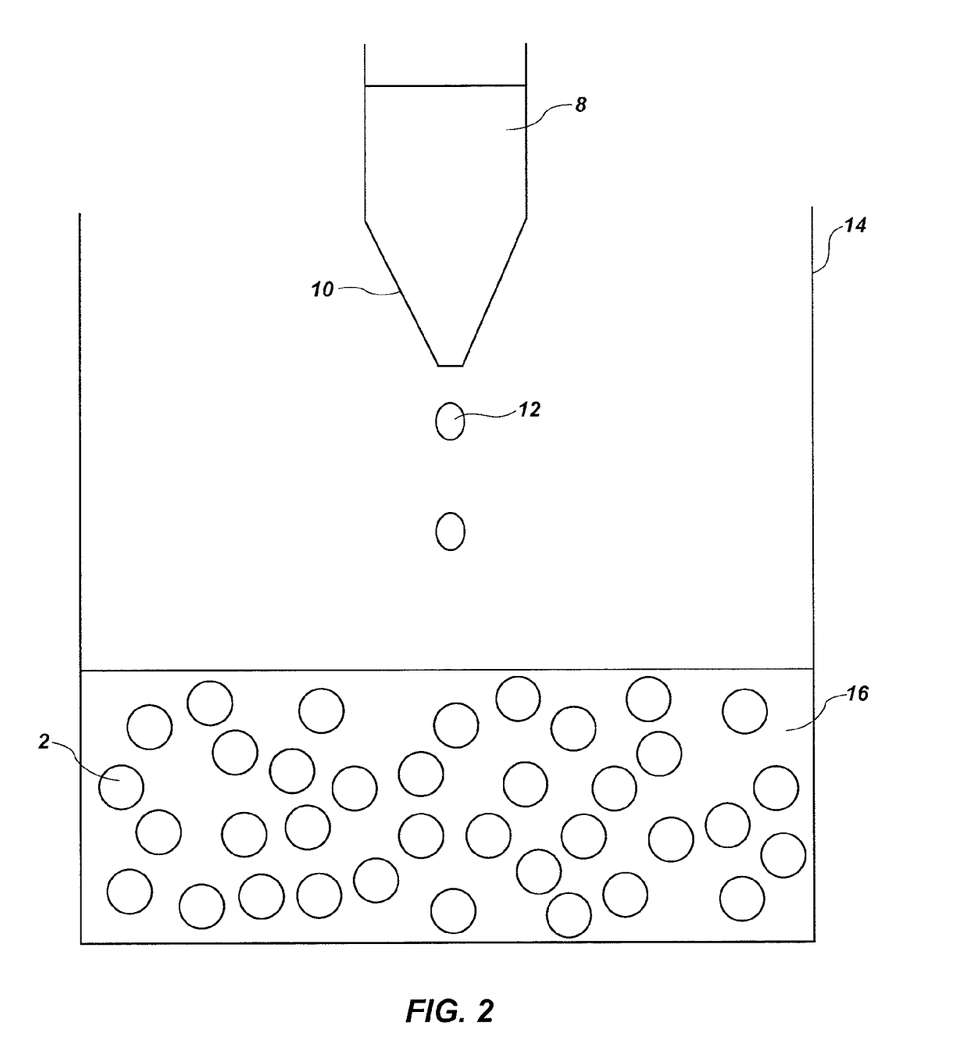
FIG. 2 is a schematic drawing illustrating a method of forming the composite media of FIG. 1, in accordance with an embodiment of the present disclosure.

FIG. 2 schematically illustrates an embodiment of a method of forming the composite media 2 of the present disclosure. As shown in FIG. 2, a composite media solution 8 including the organic polymer matrix 4 (FIG. 1), active component 6 (FIG. 1), and an organic solvent (not shown) may exit a dispensing device 10 (e.g., nozzle) as droplets 12 and enter a vessel 14 containing a quenching bath 16 to form substantially spherical beads of the composite media 2. As used herein, the term "composite media solution" means and includes any combination of the active component 6, the organic polymer matrix 4, and the organic solvent, whether such combination takes the form of a suspension, emulsion, solution, or other form. Since a person of ordinary skill in the art will recognize whether a particular instance of the term describes a solution, a suspension, or a mixture thereof from the context, for the purposes of readability and claiming the invention, the term "solution" means a solution, a suspension, or a mixture of a solution and a suspension. For example, the composite media solution 8 may be a suspension. Regardless of whether a suspension, emulsion, or solution is formed, the composite media solution 8 may be substantially homogeneous with the active component 6 uniformly dispersed throughout the organic polymer matrix 4. The formation of the composite media 2 may be conducted under processing condition that do not substantially affect the porosity and surface area of the active component 6.

To produce the composite media solution 8, the organic polymer matrix 4 (FIG. 1) may be dissolved in the organic solvent to form a matrix solution (not shown). As described previously, the term "solution" is used to collectively refer to a solution or a suspension. The amount of the organic polymer matrix 4 (FIG. 1) relative to the amount of the organic solvent may be varied as desired. For example, the organic polymer matrix 4 (FIG. 1) may be present in the matrix solution at from about 10 wt % to about 30 wt %. In at least one embodiment, the organic polymer matrix 4 (FIG. 1) is PAN. The organic solvent may be any conventional organic solvent in which the organic polymer matrix 4 is substantially soluble and the active component 6 is substantially insoluble. By way of non-limiting example, the organic solvent may be an aprotic polar organic solvent such as dimethylformamide, dimethylacetamide, dimethylsulfoxide (DMSO), sulfolane, ethylene carbonate, N-methylpyrrolidone, or combinations thereof. The organic polymer matrix 4 (FIG. 1) may be dissolved in the organic solvent using slight agitation and heating. By way of non-limiting example, the dissolution process may take place at a temperature within a range of from about 30° C. to about 80° C. and at a pressure of about 1.0 atmosphere (e.g., standard pressure). Following the formation of the matrix solution, a pre-determined amount of the at least one active component 6 (FIG. 1) may be added to the matrix solution to form the composite media solution 8. In at least some embodiments, the at least one active component 6 is hydrogen mordenite. The amount of the at least one active component 6 relative to the amount of matrix solution may be varied to facilitate formation of a composite media 2 having desired properties. The amount of the at least one active component 6 added to the matrix solution may depend on the desired loading of active component 6 in the composite media 2. The composite media solution 8 may be agitated so the at least one active component 6 is substantially homogeneously distributed therein. The resulting composite media solution 8 may have a viscosity of from about 5000 cP to about 10,000 cP at 25° C. To achieve high loading of the at least one active component 6 in the composite media 2, the at least one active component 6 may be present in the composite media solution 8 at a maximal concentration. If a maximum concentration of the at least one active component 6 in the composite media 2 is not desired, the amount of the at least one active component 6 in the composite media solution 8 may be decreased from the maximum solubility to provide a desired concentration.

While the above description describes dissolving the organic polymer matrix 4 (FIG. 1) in the organic solvent and then adding the at least one active component 6 (FIG. 1) to form the composite media solution 8, the at least one active component 6 (FIG. 1), the organic polymer matrix 4 (FIG. 1), and the organic solvent may be combined in any order to form the composite media solution 8. For example, the at least one active component 6 (FIG. 1) may first be added to the organic solvent, followed by addition of the organic polymer matrix 4 (FIG. 1) to form the composite media solution 8. As another example, the at least one active component 6 (FIG. 1) may first be added to the organic polymer matrix 4 (FIG. 1), followed by the addition of the organic solvent to form the composite media solution 8.

With continued reference to FIG. 2, the dispensing device 10 may be a conventional spray nozzle that is configured to form droplets 12 of a desired size. The dispensing device 10 may utilize at least one of an inert gas (e.g., nitrogen) and air to accelerate formation or release of the droplets 12. The size of the droplets 12, and hence the size of the resulting substantially spherical beads of the composite media 2 formed from droplets 12, may be adjusted by modifying at least one of an outlet (e.g., nozzle) diameter of the dispensing device 10 and a flow rate of the inert gas and/or air. In addition, the distance from the outlet of the dispensing device 10 to the quenching bath 16 may be adjusted to enable the droplets 12 to assume a substantially spherical shape prior to entering the quenching bath 16. The quenching bath 16 may be stirred while the composite media solution 8 is sprayed into it.

While the above description describes forming substantially spherical beads of the composite media 2, one of ordinary skill in the art will recognize that the composite media 2 may be configured into different shapes or structures. By way of non-limiting example, one or more of the outlet diameter of the dispensing device 10, the flow rate of the inert gas and/or air, and the distance from the outlet of the dispensing device 10 to the quenching bath 16 may be adjusted to form the composite media 2 into additional shapes or structures (e.g., cylinders, ellipsoids, etc.). Therefore, as used herein, unless limited by a preceding term such as "spherical," the term "beads" means and includes an element of solidified composite media 2 without regard to a particular shape thereof.

The quenching bath 16 may include a material within which the active component 6 (FIG. 1) and the organic polymer matrix 4 (FIG. 1) are substantially insoluble. In at least some embodiments, the quenching bath 16 includes water. The material of the quenching bath 16 may dilute, remove, or neutralize the organic solvent in the droplets 12, enabling the organic polymer matrix 4 (FIG. 1) of the composite media solution 8 to become insoluble and solidify. As the organic polymer matrix 4 (FIG. 1) solidifies, the at least one active component 6 (FIG. 1) becomes incorporated or entrapped therein to form the beads of composite media 2. The properties of the organic polymer matrix 4 (FIG. 1) facilitate the formation of multiple beads of composite media 2 having substantially consistent volume and including substantially consistent amounts of the at least one active component 6. As shown in FIG. 1, the at least one active component 6 may be homogeneously dispersed within the organic polymer matrix 4. In one or more embodiments, the composite media 2 may include about 80 wt % hydrogen mordenite and about 20 wt % PAN. The hydrogen mordenite may be homogeneously dispersed within the PAN.

The beads of composite media 2 including the at least one active component 6 (FIG. 1) immobilized or entrapped in the organic polymer matrix 4 (FIG. 1) may be removed from the quenching bath 16, rinsed with water, and dried. Rinsing the beads of composite media 2 with water may remove residual organic solvent. The beads of composite media 2 may, alternatively, be stored until needed without a water rinse. The composite media 2 may be dried by at least one of heating and flowing air over the composite media 2. After drying, the composite media 2 may be packed or loaded into a suitable separation device, as described in further detail below. The composite media 2 may, optionally, be screened to achieve a desired size fraction of the composite media 2.

Figure 3:
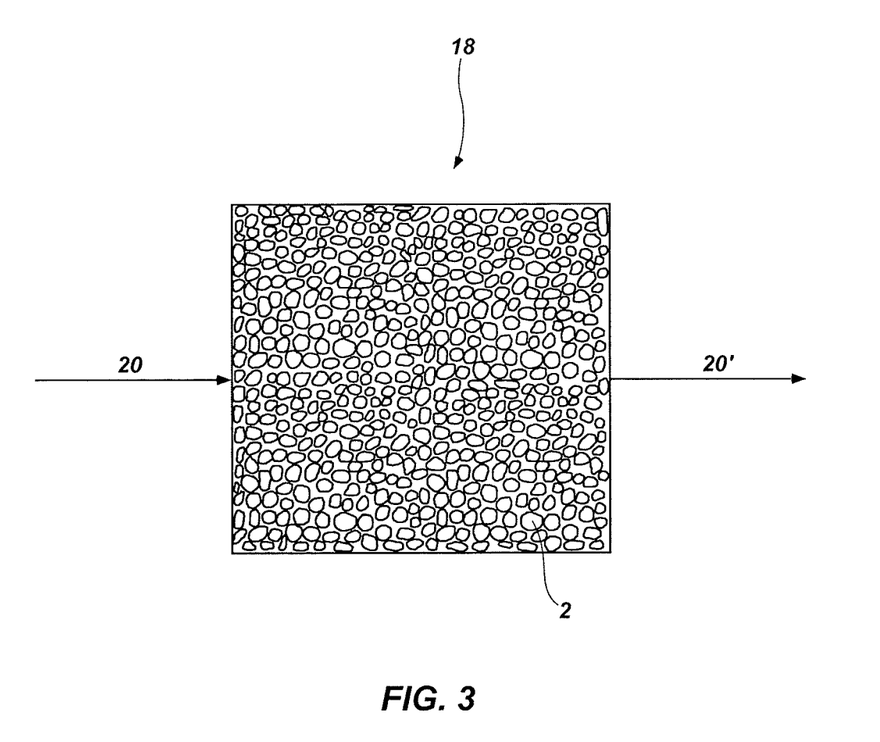
FIG. 3 is a schematic drawing illustrating a method of using the composite media of FIG. 1 to process a fluid stream, in accordance with an embodiment of the present disclosure.

FIG. 3 schematically illustrates an embodiment of a method of processing a fluid stream 20 using the composite media 2 of the present disclosure. As shown in FIG. 3, the beads of composite media 2 may be packed into a bed 18, and may used to remove at least one constituent (not shown) from the fluid stream 20. Packed media beds 18 are known in the art and, therefore, the formation of the packed bed 18 is not described in detail herein. The packed bed 18 may include a housing (not shown) within which the composite media 2 is contained. In at least one embodiment, substantially spherical beads of the composite media 2 are packed such that sufficient spaces, which may also be characterized as voids, are present between the packed, substantially spherical beads to enable the fluid stream 20 to pass through the packed bed 18.

The fluid stream 20, including the at least one constituent to be removed, may be configured as described above in relation to FIG. 1. For example, in at least some embodiments, the fluid stream 20 may be a substantially gaseous stream, such as a nuclear fuel treatment off-gas stream, including at least one of a radioactive isotope of Kr (e.g., $^{85}$Kr), a non-radioactive isotope of Kr, Xe, $N_2$, $O_2$, a radioactive isotope of I (e.g., $^{131}$I, $^{129}$I), and a non-radioactive isotope of I.

To remove the at least one constituent (e.g., Kr, Xe, $O_2$, $N_2$, I) from the fluid stream 20, the fluid stream 20 may be passed through the composite media 2 of the packed bed 18 in a single pass operation. Since the organic polymer matrix 4 (FIG. 1) of the individual beads of the composite media 2 is macroporous, at least a portion of the fluid stream 20 may enter into one or more beads of the composite media 2, and interact with the at least one active component 6 (FIG. 1) affixed or absorbed to the organic polymer matrix 4. The at least one constituent of the fluid stream 20 may become bound in available pores of at the least one active component 6 (FIG. 1) by way of one or more of physisorption and chemisorption, as described above in relation to FIG. 1. Thus, the at least one constituent may become immobilized in the beads of the composite media 2. The packed bed 18 of the composite media 2 may, therefore, remove a substantial portion of the at least one constituent, even when the fluid stream 20 includes a low concentration of the at least one constituent. Since the composite media 2 has a high capacity for the at least one constituent, a fluid stream 20' exiting the packed bed 18 may be substantially free of the at least one constituent. For example, when the fluid stream 20 includes at least one of Kr (i.e., a radioactive isotope and/or a non-radioactive isotope thereof), Xe, $N_2$, $O_2$, and I (i.e., a radioactive isotope and/or a non-radioactive isotope thereof), the fluid stream 20' exiting the packed bed 18 may be substantially free of at least one of the Kr, Xe, $N_2$, $O_2$, and I.

The fluid stream 20 may be passed through the packed bed 18 maintained at a temperature less than a decomposition temperature of the organic polymer matrix 4 (FIG. 1) of the composite media 2. By way of non-limiting example, the fluid stream 20 may be passed through the packed bed 18 maintained at a temperature within a range of from about −180° C. to about 150° C., such as from about −80° C. to about 0° C., or from about −80° C. to about −40° C. In at least some embodiments, the packed bed 18 is maintained at a temperature with a range of from about −80° C. to about −50° C. Passing the fluid stream 20 through the packed bed 18 at cryogenic temperatures (e.g., temperatures below about −150° C.) may result in relatively increased load capacities for the composite media 2. When the fluid stream 20 is a gaseous stream (e.g., an nuclear fuel treatment off-gas stream including one or more of radioactive isotopes of Kr, non-radioactive isotopes of Kr, radioactive isotopes of I, non-radioactive isotopes of I, and Xe), the fluid stream 20 may be passed through the packed bed 18 at a temperature less than a decomposition temperature of the organic polymer matrix 4 (FIG. 1) of the composite media 2 and greater than a liquefaction temperature of the fluid stream 20.

When the composite media 2 of the beads becomes loaded with the at least one constituent to a pre-determined capacity (e.g., a maximum capacity), the at least one constituent may be desorbed from the composite media 2 using at least one of increased temperature (e.g., temperature swing adsorption processing) and decreased pressure (e.g., pressure swing adsorption processing). By way of non-limiting example, the packed bed 18 may be exposed to an increase in temperature and a purge gas stream to desorb the at least one constituent from the composite media 2, removing the at least one constituent from the packed bed 18. When the packed bed 18 includes different adsorbed constituents (e.g., a radioactive isotope of Kr, a non-radioactive isotope of Kr, and Xe) the packed bed 18 may, optionally, be exposed to at least one of a gradual (e.g., continuous) increase in temperature and multiple abrupt (e.g., stepwise) increases in temperature to substantially desorb at least one of the different adsorbed constituents prior to substantially desorbing at least one other of the different adsorbed constituents (e.g., desorbing a radioactive isotope of Kr and a non-radioactive isotope of Kr prior to removing Xe). Following the desorption and removal process, the at least one constituent may be recovered and utilized, or disposed of as desired and the packed bed 18 may be reused. The process may, for example, be utilized as a relatively low cost source of Xe (e.g., as compared to many complex conventional processes for acquiring Xe, such as through cryogenic distillation). The Xe may, for example, be recovered from the composite media 2 and used in medical applications. In additional embodiments, at least a portion of the packed bed 18 including the composite media 2 having the at least one constituent adsorbed thereon may be removed from the housing (not shown) and disposed of as desired. By way of example, if the at least one constituent in the fluid stream includes noble gas fission products or halogens, the noble gas fission products or halogens may be removed from the fluid stream to reduce the radioactivity of the fluid stream.

The composite media 2 disclosed herein is advantageous at least because the porosity of the organic matrix material 4 (FIG. 1) enables a relatively larger surface area of the active component 6 (FIG. 1) to be exposed, improving the capacity of the composite media 2 to process a fluid stream as compared to conventional composite media in which a smaller portion of the active component (e.g., only the active component exposed along an outer peripheral surface of the convention composite media) may come into contact with the fluid stream or where the amount of active component employed in the composite media is otherwise restricted. The effectiveness of a composite media is at least partially a function of the size of the surface area of the active component 6 with which the fluid stream being processed comes into contact. The relatively larger surface area of the active component 6 of the composite media 2 enables the removal of relatively more material from the fluid stream. The increased loading of the active component 6 provided by the porosity of the organic matrix material 4 may also facilitate the relatively faster removal of the material from the fluid stream and the use of smaller packed bed volumes (i.e., the use of a smaller quantity of beads of composite media 2) to achieve the same or better material removal as a larger amount of conventional composite media. With the increased active component loading, the composite media 2 may have an increased capacity for the constituents in the feed stream compared to the capacity of conventional composite media. Further, the shape of the composite media 2 and the porosity of the organic matrix material 4 therein may enable the composite media 2 to be used in high flow rate applications, such as those encountered in industrial (e.g., nuclear fuel treatment) environments. The composite media 2 may, therefore, be more effective and more efficient than many conventional composite media. In turn, the relatively increased effectiveness and efficiency of the composite media 2 may comparatively reduce the cost of processing the fluid stream.

The composite media 2 disclosed herein is additionally advantageous at least because the radiolytic stability thereof facilitates the use of the composite media 2 to process a fluid stream including at least one radioactive isotope (e.g., $^{85}$Kr, $^{131}$I, $^{129}$I). Many conventional composite media having similar active component loading and surface area (i.e., as defined by the porosity of the supporting matrix of the conventional composite media) do not possess such radiolytic stability and, hence, are not suitable for such processing.

The following examples serve to explain embodiments of the present disclosure in more detail. These examples are not to be construed as being exhaustive, exclusive, or otherwise limiting as to the scope of the disclosure.

EXAMPLES

Example 1

Preparation of Porous Solid Beads of Composite Media Including Hydrogen Mordenite Incorporated in a PAN Matrix Porous solid beads of composite media were prepared by first adding 10.0 grams of hydrogen mordenite powder to 30.0 milliliters of DMSO with mixing and at 80° C. 2.0 grams of the PAN was dissolved in the solution to form a homogeneous hydrogen mordenite/PAN suspension. The hydrogen mordenite/PAN suspension was then sprayed through an air/nozzle device into a stirred quenching bath of de-ionized water to form porous solid beads including hydrogen mordenite entrapped within PAN. The porous solid beads were removed from the water bath, rinsed with additional water, dried, and screened to obtain a desired size fraction of the porous solid beads. The porous solid beads had about 80 wt % hydrogen mordenite and about 20 wt % PAN. The porous solid beads did not decompose at a temperature of up to approximately 150° C.

Example 2

Determination of Active Component Surface Area

The surface area of the hydrogen mordenite present within the porous solid beads of the composite media described in Example 1 was determined using a Micromeritics ASAP 2020surface area analyzer. The surface area was determined to be 336 m$^2$/gm. As a comparative example, a sample of hydrogen mordenite in powder form (i.e., hydrogen mordenite that is not entrapped with a PAN matrix) was determined to have a surface area of 483 m²/gm, suggesting that about 70% of the surface area of the hydrogen mordenite is available in porous solid beads of composite media including up about 80 wt % hydrogen mordenite in a PAN matrix. Hence, the surface area of the active component was not significantly reduced in the porous solid beads of composite media.

Example 3

Determination of Krypton Load Capacity

The porous solid beads of the composite media described in Example 1 were tested to determine Kr load capacity. The porous solid beads were exposed to a feed gas containing 150 ppm of Kr in helium at −83.15° C. The results of the testing indicated that the porous solid beads of composite media had a loading capacity of $1.04 \times 10^{-4}$ mol Kr/gm sorbent.

Example 4

Determination of Xenon Load Capacity for Porous Solid Beads of Composite Media Including Hydrogen Mordenite Incorporated in a PAN Matrix Porous solid beads of composite media including silver mordenite in a PAN matrix were prepared in a manner substantially similar to that described in Example 1. The porous solid beads of composite media were then tested to determine Xe load capacity. The porous solid beads were exposed to a feed gas containing 1000 ppm Xe in helium at ambient temperature. The results of the testing indicated the porous beads of composite media had a Xe loading capacity of $6.22 \times 10^{-5}$ mol Xe/gm sorbent.

While the present disclosure is susceptible to various modifications and alternative forms, specific embodiments have been shown by way of example in the drawings and have been described in detail herein. However, the present disclosure is not intended to be limited to the particular forms disclosed. Rather, the present disclosure is to cover all modifications, equivalents, and alternatives falling within the scope of the present invention as defined by the following appended claims and their legal equivalents.

What is claimed is:

1. A composite media, comprising:
an organic polymer matrix comprising polyacrylonitrile; and
a crystalline aluminosilicate material within the organic polymer matrix and comprising hydrogen mordenite.

2. The composite media of claim 1, wherein the crystalline aluminosilicate material further comprises silver mordenite.

3. The composite media of claim 1, wherein the hydrogen mordenite is present in the composite media at from about 70 percent by weight to about 90 percent by weight.

4. The composite media of claim 1, wherein the crystalline aluminosilicate material comprises homogeneous, substantially spherical beads.

5. The composite media of claim 1, wherein an exposed surface area of the crystalline aluminosilicate material within the organic poymer matrix is within a range of from about 250 m²/g to about 450 m²/g.

6. The composite media of claim 1, wherein the crystalline aluminosilicate material is homogeneously dispersed in the organic polymer matrix.

7. A method of forming a composite media, comprising:
dissolving polyacrylonitrile in an organic solvent to foam a matrix solution;
combining a crystalline aluminosilicate material comprising hydrogen mordenite with the matrix solution to form a composite media solution;
diluting the organic solvent in the composite media solution; and
solidifying the composite media solution.

8. The method of claim 7, wherein dissolving polyacrylonitrile in an organic solvent to form a matrix solution comprises dissolving from approximately 10 percent by weight to approximately 30 percent by weight polyacrylonitrile in the organic solvent.

9. The method of claim 7, wherein diluting the organic solvent present in the composite media solution comprises introducing droplets of the composite media solution into water.

10. The method of claim 9, wherein solidifying the composite media solution comprises forming homogeneous, substantially spherical beads from the droplets of the composite media solution.

11. The method of claim 7, wherein solidifying the composite media solution comprises entrapping the crystalline aluminosilicate material in the polyacrylonitrile.

12. A method of processing a fluid stream, comprising:
providing beads of a composite media comprising:
an organic polymer matrix comprising polyacrylonitrile; and
a crystalline aluminosilicate material within the organic polymer matrix and comprising hydrogen mordenite;
contacting the beads of composite media with a fluid stream comprising at least one constituent; and
substantially removing the at least one constituent from the fluid stream.

13. The method of claim 12, wherein contacting the beads of composite media with a fluid stream comprising at least one constituent comprises passing a gaseous stream comprising at least one of Kr and Xe through the composite media.

14. The method of claim 13, wherein substantially removing the at least one constituent from the fluid stream comprises physically adsorbing the at least one of Kr and Xe to the crystalline aluminosilicate material.

15. The method of claim 14, further comprising desorbing the at least one of Kr and Xe from the crystalline aluminosilicate material by exposing the beads of composite media to at least one of increased temperature and decreased pressure.

16. The method of claim 12, wherein contacting the beads of composite media with a fluid stream comprising at least one constituent comprises passing a gaseous stream comprising at least one radioactive isotope through the composite media.

17. The method of claim 14, wherein the at least one radioactive isotope comprises at least one radioactive isotope of krypton.

18. The method of claim 17, wherein substantially removing the at least one constituent from the fluid stream comprises substantially removing the at least one radioactive isotope of krypton from the gaseous stream by way of physisorption.

19. The method of claim 16, wherein the at least one radioactive isotope comprises at least one of a radioactive isotope of iodine.

20. The method of claim 19, wherein substantially removing the at least one constituent from the fluid stream comprises substantially removing the at least one radioactive isotope of iodine from the gaseous stream by way of chemisorption.

21. The composite media of claim 1, wherein the composite media is formulated to substantially resist degradation in the presence of at least one radioactive isotope.

22. The composite media of claim 1, wherein the crystalline aluminosilicate material is configured and formulated to physically adsorb at least one of Kr and Xe.

23. The composite media of claim 1, wherein the organic polymer matrix comprises pores larger than about 50 nanometers.

24. The composite media of claim 1, wherein the crystalline aluminosilicate material comprises pores smaller than about 2 nanometers.

25. The composite media of claim 1, wherein the organic polymer matrix consists of polyacrylonitrile, and wherein the crystalline aluminosilicate material consists of hydrogen mordenite.

26. The composite media of claim 1, wherein the composite media comprises about 20 percent by weight polyacrylonitrile and about 80 percent by weight hydrogen mordenite.

* * * * *

UNITED STATES PATENT AND TRADEMARK OFFICE
CERTIFICATE OF CORRECTION

| | | |
|---|---|---|
| PATENT NO. | : 8,686,083 B2 | Page 1 of 1 |
| APPLICATION NO. | : 13/291214 | |
| DATED | : April 1, 2014 | |
| INVENTOR(S) | : Troy G. Garn et al. | |

It is certified that error appears in the above-identified patent and that said Letters Patent is hereby corrected as shown below:

On the title page:
In ITEM (75) Inventors:  change the two occurrences of "Mena, AZ" to --Mena, AR--

In ITEM (57) ABSTRACT:
   (line 10)  change "providing a beads" to --providing beads--

In the claims:
CLAIM 7,   COLUMN 12,   LINE 2,   change "to foam a" to --to form a--
CLAIM 17,  COLUMN 12,   LINE 52,  change "claim 14," to --claim 16,--

Signed and Sealed this
Thirteenth Day of January, 2015

Michelle K. Lee
*Deputy Director of the United States Patent and Trademark Office*